United States Patent
Margulis et al.

(10) Patent No.: US 9,229,237 B2
(45) Date of Patent: Jan. 5, 2016

(54) HELMET MOUNTED DISPLAY SYSTEM ADJUSTABLE FOR BRIGHT AMBIENT LIGHT CONDITIONS

(71) Applicant: Elbit Systems Ltd., Haifa (IL)

(72) Inventors: Miron Margulis, Haifa (IL); Joseph Yaeli, Haifa (IL); Sasson Abraham, Haifa (IL)

(73) Assignee: Elbit Systems Ltd., Haifa (IL)

( * ) Notice: Subject to any disclaimer, the term of this patent is extended or adjusted under 35 U.S.C. 154(b) by 254 days.

(21) Appl. No.: 14/139,160

(22) Filed: Dec. 23, 2013

(65) Prior Publication Data

US 2014/0111864 A1 Apr. 24, 2014

Related U.S. Application Data

(63) Continuation-in-part of application No. PCT/IL2012/000261, filed on Jun. 21, 2012.

(30) Foreign Application Priority Data

Jun. 22, 2011 (IL) .......................................... 213727

(51) Int. Cl.
*G02B 27/14* (2006.01)
*G02B 27/01* (2006.01)
*G02B 5/20* (2006.01)

(52) U.S. Cl.
CPC .............. *G02B 27/0172* (2013.01); *G02B 5/20* (2013.01); *G02B 2027/0118* (2013.01); *G02B 2027/0132* (2013.01); *G02B 2027/0138* (2013.01); *G02B 2027/0156* (2013.01); *G02B 2027/0167* (2013.01)

(58) Field of Classification Search
USPC .................................................. 359/630, 632
See application file for complete search history.

(56) References Cited

U.S. PATENT DOCUMENTS

| | | | |
|---|---|---|---|
| 4,449,787 A | 5/1984 | Burbo et al. |
| 5,640,711 A | 6/1997 | Lefort et al. |
| 5,835,277 A | 11/1998 | Hegg |
| 5,841,408 A | 11/1998 | Rickard |
| 6,008,946 A | 12/1999 | Knowles |
| 6,049,367 A | 4/2000 | Sharp et al. |
| 7,893,890 B2 | 2/2011 | Kelly et al. |
| 2010/0053030 A1 | 3/2010 | Sprague |

FOREIGN PATENT DOCUMENTS

| | | |
|---|---|---|
| DE | 17 72 014 | 6/1970 |
| EP | 0 066 402 | 12/1982 |
| EP | 2 312 373 | 4/2011 |
| GB | 2 155 762 | 10/1985 |
| GB | 2 161 121 | 1/1986 |
| JP | 2009-92807 | 4/2009 |
| JP | 2009-92808 | 4/2009 |

OTHER PUBLICATIONS

International Search Report for International Application No. PCT/IL2012/000261 mailed Nov. 22, 2012 (11 pages).

*Primary Examiner* — Jack Dinh
(74) *Attorney, Agent, or Firm* — Merchant & Gould P.C.

(57) ABSTRACT

A Helmet Mounted Display (HMD) system, to be mounted on a helmet of a user, includes a tinted visor, coupled with the helmet, located in front of the face of the user when the tinted visor is in an operative position. The tinted visor further includes a patch, which is located in front of an eye of the user. The patch has greater light transmission than the rest of the tinted visor. The HMD system includes an image generator, coupled with the helmet, generating an image to be displayed to the user. The HMD system further includes an optical combiner, coupled with the helmet, and located substantially on the optical axis of the user's eye. The combiner reflects the generated image toward the eye, and transfers light rays of an outside scene toward the eye.

21 Claims, 7 Drawing Sheets

HELMET MOUNTED DISPLAY SYSTEM ADJUSTABLE FOR BRIGHT AMBIENT LIGHT CONDITIONS

This application is a Continuation-in-Part of PCT/IL2012/00261 filed, 21 Jun. 2012, which claims benefit of Serial No. 213727, filed 22 Jun. 2011 in Israel and which applications are incorporated herein by reference. To the extent appropriate, a claim of priority is made to each of the above disclosed applications.

FIELD OF THE INVENTION

The disclosed technique relates to helmet mounted display systems, in general, and to helmet mounted display systems with tinted visors, in particular.

BACKGROUND OF THE INVENTION

A head mounted display, and in particular a Helmet Mounted Display (HMD) allows a user to view a generated image superimposed on a scenery image. In a typical HMD, this is achieved by projecting the generated image on a transparent surface (i.e., an optical combiner) positioned in front of the user's eyes. The brightness of the generated image should provide a minimum level of contrast relative to the brightness of the scenery, in order for the user to have a good view of both. The visor of a helmet with a HMD may be a tinted visor (i.e., a shaded visor), having lower light transmission than a clear visor. Such tinted visor reduces the brightness of the ambient light arriving at the user's eye, in order to provide the user with a better view in bright conditions. The degree of transmission or alternatively the transmission of certain wavelengths may vary from visor to visor. Furthermore, the transmission of the visor may be adjustable and controllable, automatically or manually. HMD systems with a tinted visor are known in the art.

In HMD systems which include a display located outside of a tinted visor, the display is required to generate a bright-enough image, which, after being attenuated by the tinted visor, would reach the user's eye with similar brightness as the ambient scene image. Therefore, the image generator is required to be a high-power image generator, which requires, respectively, a strong power supply. Such a strong power source would generally consume a high volume of space, which would increase the volume of the display system, and the bulkiness thereof. Furthermore, a high-power image generator and a strong power supply are likely to produce heat, such that would require addition of cooling elements to the display system. Such cooling elements would further increase the volume of the display system.

U.S. Pat. No. 6,008,946 issued to Knowles, entitled "Ambient light display illumination for a head mounted display" is directed to a head mounted display which uses ambient light to backlight a display to similar brightness as the scene being viewed. The system is mounted on a helmet unit or other head-mounting. The system includes a visor, an ambient light director, a display, a beam splitter and a combiner. The beam splitter and the combiner are placed in the line of sight of the user between the user's eye and the visor. The display is situated so that the generated image falls on to the beam splitter. The ambient light director is located so it would direct light to the backside of the display. The visor includes a shaded portion corresponding to the field of view of the user, and a clear portion which allows a predetermined amount of light into a selected portion of the helmet unit. Images from objects in the field of view of the user pass through the shaded portion of the visor, the combiner and through the beam splitter to the user's eye. Ambient light passes through the clear portion of the visor to the ambient light director which directs the light onto the back of the display. The display can be of any type that uses backlighting such as an LCD display. The image generated by the display is reflected by the beam splitter toward the combiner and then toward the user's eye.

U.S. Pat. No. 5,640,711 issued to Lefort et al. entitled "Head-mounted visor with variable transmission", is directed to a head-mounted visor having at least two zones with different values of absorption of light. The visor includes two functionally different zones. One zone has a higher absorption, and corresponds to the wearer's visual field of the outside scene. Another has a lower absorption, and corresponds to the view of the dashboard instruments.

U.S. Pat. No. 5,835,277 issued to Hegg, entitled "Modular helmet mounted display" is directed to a helmet mounted display system. The system includes a helmet mounted visor/combiner, an image source and relay optics (ISRO). The visor/combiner has a transparent window portion at one side adjacent to one eye of the user, and a transparent viewing portion at the opposite side in front of the other eye of the user. The ISRO projects an image inwardly of the visor/combiner through the window portion and onto the inner surface of the viewing portion of the visor/combiner, focused at infinity. The image is partially reflected from the inner surface of the viewing portion toward the eye of the user, allowing the user to see the image superimposed upon the outside scene.

U.S. Pat. No. 7,893,890 issued to Kelly et al. and entitled "Electrically dimmable combiner optics for head-up display", is directed to a system for providing head-up displays with variable light transmission. The system includes a combiner and a projector, wherein the projector projects an image onto the combiner. Alternatively, the combiner may have an internally integrated display module. The system also includes a light sensor, which detects the light intensity outside the cockpit portion. The light sensor transfers this information to an operatively coupled combiner control device coupled with the combiner. The control device adjusts the transmission of the combiner after receiving information relating to ambient the light intensity. Further alternatively, the operator may manually control the transmission of the combiner.

The combiner may include one or more segments to provide varying levels of transmission of light. For example, the combiner may be divided vertically, horizontally, or both, to create segments of the combiner. Additionally, the combiner may be wearable, for example in the form of a visor attached to a helmet.

SUMMARY OF THE PRESENT DISCLOSED TECHNIQUE

It is an object of the disclosed technique to provide a novel Helmet Mounted Display (HMD) system with a tinted visor, for presenting an outside scene and a generated image to a user suitable for bright light conditions.

In accordance with the disclosed technique, there is thus provided a Helmet Mounted Display (HMD) system, to be mounted on a helmet of a user, said HMD comprising a tinted visor, coupled with the helmet, the tinted visor being located in front of the face of the user when the tinted visor is in an operative position. The tinted visor further includes a patch, which is located in front of an eye of the user. The patch may have greater light transmission than the rest of the tinted visor. In certain cases, the patch may allow light transmission which is similar to the rest of the tinted visor. The HMD system further includes an image generator, coupled with the helmet, generating an image to be displayed to the user. The HMD system also includes an optical combiner, coupled with the helmet, and located substantially on the optical axis of the user's eye. The combiner reflects the generated image toward the eye, and transfers light rays of an outside scene toward the eye.

In accordance with another embodiment of the disclosed technique, there is thus provided a Helmet Mounted Display (HMD) system, to be mounted on a helmet of a user. The HMD system includes a tinted visor, coupled with the helmet, and located in front of the face of the user when the tinted visor is in an operative position. The tinted visor further includes a patch, located in front of an eye of the user, and which may have greater light transmission than the rest of the tinted visor. In certain cases, the patch may allow light transmission which is similar to the rest of the tinted visor. The HMD system further includes a display screen, located substantially in front of the patch and substantially on the optical axis of the eye.

The HMD system also includes an image acquisition device, coupled with the screen, for acquiring an outside scene image, and transmitting the outside scene image for display on the screen. The HMD system further includes an image generator, coupled with the helmet and with the screen, for generating an image to be displayed to the user. The image generator transmits the generated image to be superimposed with the outside scene image on the screen. The superimposed image is transmitted through the patch toward the user's eye.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a Helmet Mounted Display (HMD) system with a tinted visor and an image display goggle, located in front of the user's eye. The tinted visor includes a patch in front of the user's eye or eyes, the patch having greater light transmission than the tinted visor (although in certain cases, the patch may allow light transmission which is similar to the rest of the tinted visor). This allows the generated image to pass from the image display goggle directly toward the user's eye, without being attenuated by the tinted visor. The patch of the visor may be transparent and have constant un-tinted light transmission, or the patch may have controllable (i.e., adjustable) light transmission, which may be adjusted manually or automatically. It is noted that the patch may alternatively be a hole in the visor, from which the visor material is removed, allowing light to pass directly there through.

The image display goggle includes an optical combiner, which directs a display image toward the user's eye. The combiner also allows for an image of the outside scene to pass there through, toward the user's eye. When the ambient light conditions are very bright (e.g., when an aircraft flies over a desert, water, clouds, or through bright sunlight), the outside scene may be brighter than the display generated image. Thus, an optical cover, which may be with controllable light transmission, is placed in front of the display goggle, in order to attenuate the brightness of the ambient scene, in a similar attenuation (i.e., light transmission) that the tinted visor attenuates the ambient light reaching the user's eyes. In this manner, the image display goggle transmits the display generated image and the outside scene with similar brightness to the outside scene observed by the user through parts of the tinted visor, other than through the patch.

It is noted, that the term "similar" as used herein with regard to the relation between the tint level of the optical cover and the tint level of the tinted visor, refers to an acceptable ratio of light transmission between viewing the scene through the display goggle and viewing the scene directly through the tinted visor. Each user may tolerate (i.e., accept) a different level of this light-transmission ratio. Thus, the term "similar" in this regard refers to a range of tint levels, which may be applied to the optical cover, such that the light transmission ratio would be acceptable by the user. According to an embodiment of the disclosed technique, each user may further have the possibility of setting a different tint level to the optical cover, according to their respective individual tolerable light transmission ratio.

Figure 1A:
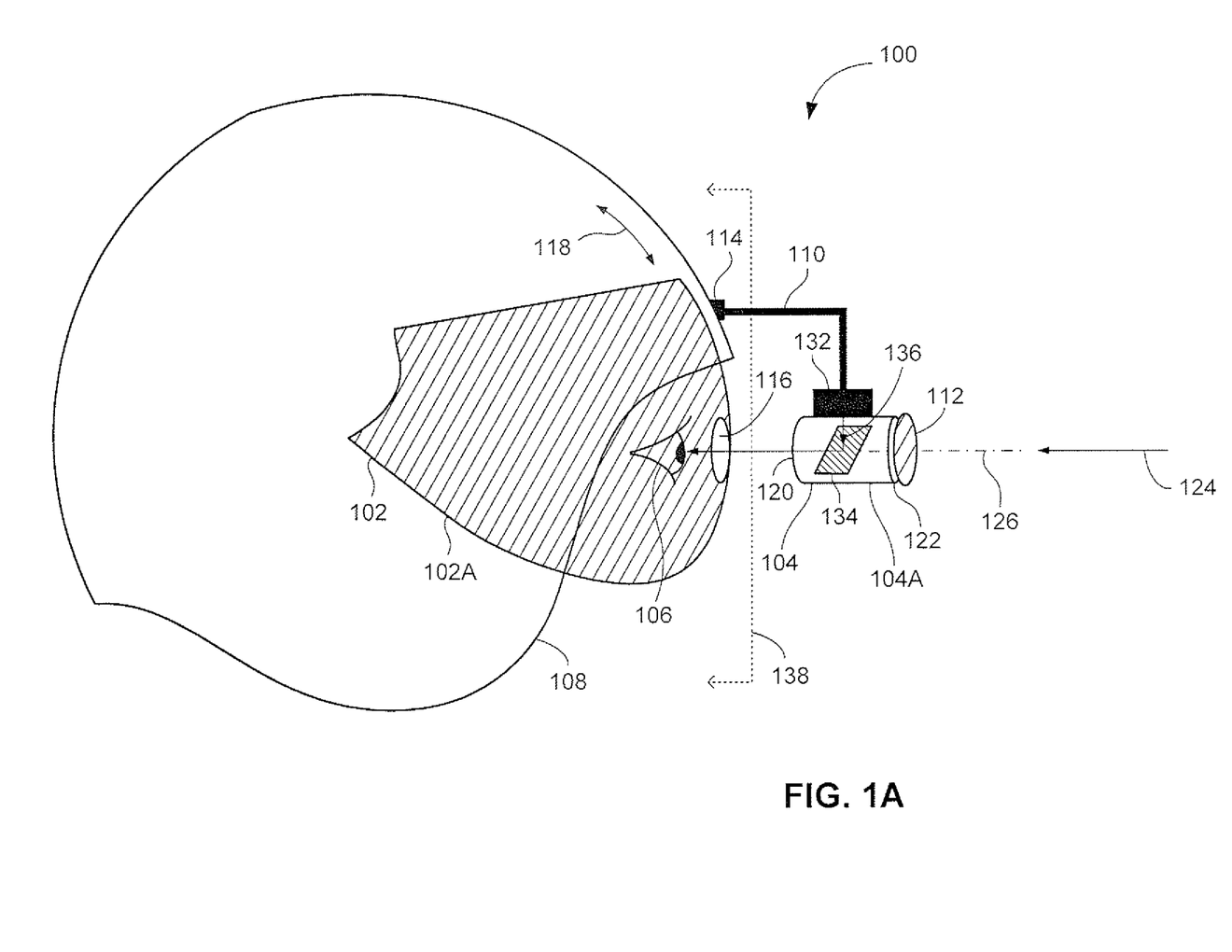
FIG. 1A is a schematic illustration side view of a HMD system, constructed and operative in accordance with an embodiment of the disclosed technique, in which the visor and the display goggle are in operative positions.
Figure 1B:
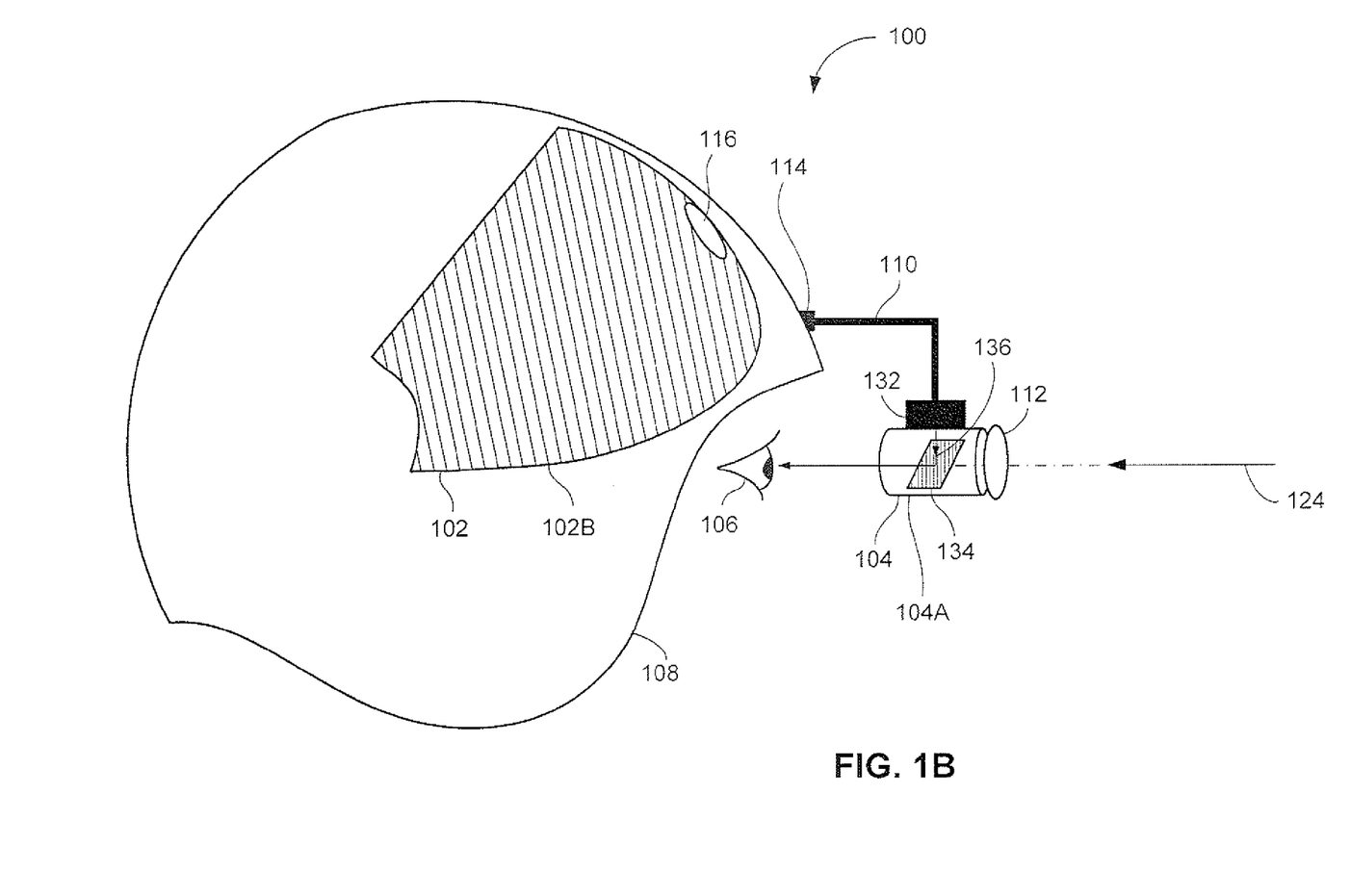
FIG. 1B is a schematic illustration of the system of FIG. 1A, in which the display goggle is in an operative position and the visor is in a stowed position.
Figure 1C:
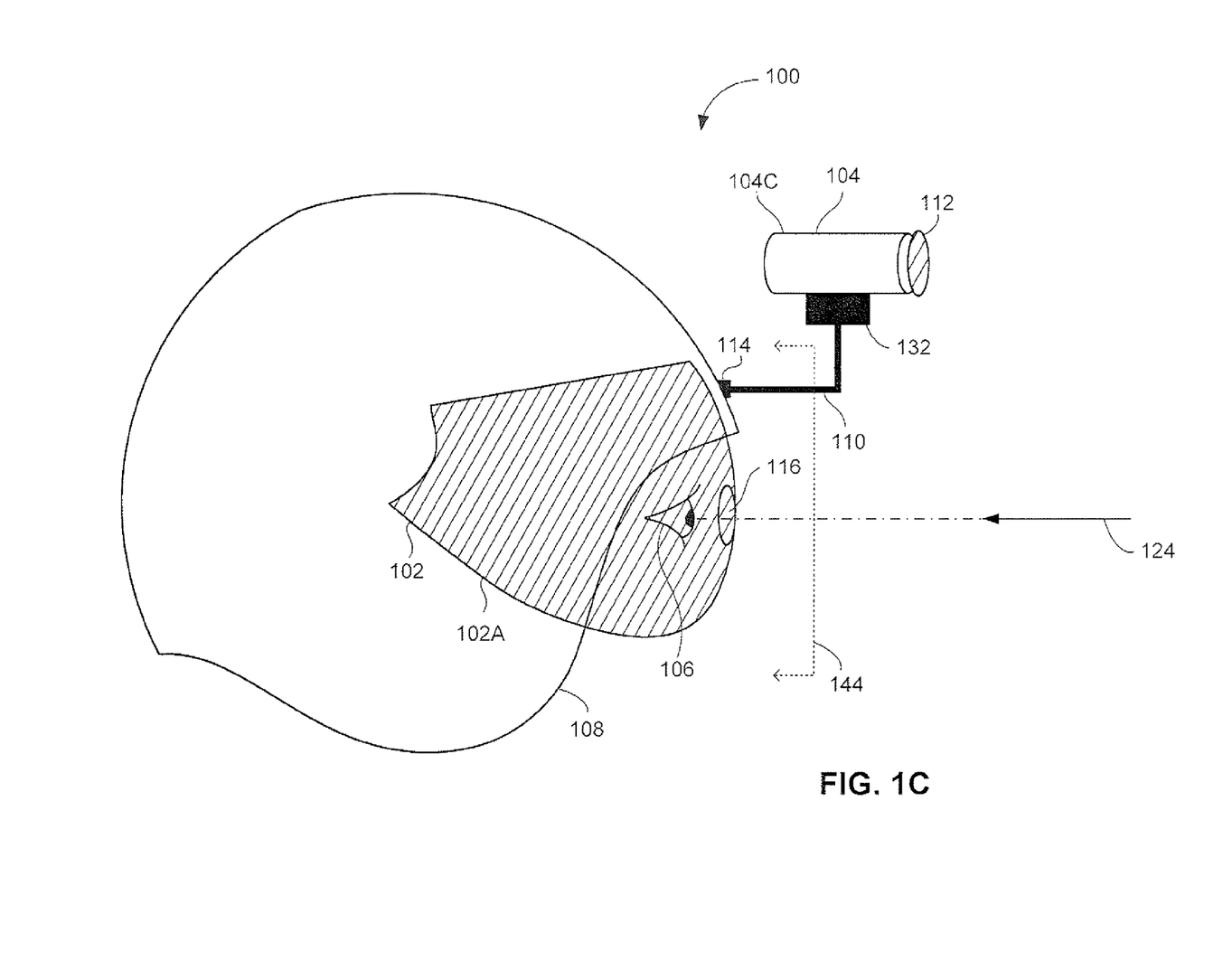
FIG. 1C is a schematic illustration of the system of FIG. 1A, in which the visor is in an operative position and the display goggle is in a stowed position.
Figure 2:
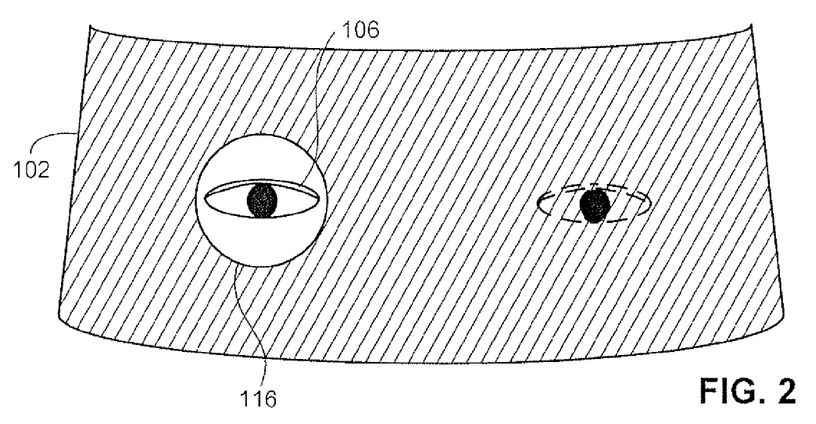
FIG. 2 is a schematic illustration front view of the visor of FIG. 1A.
Figure 3:
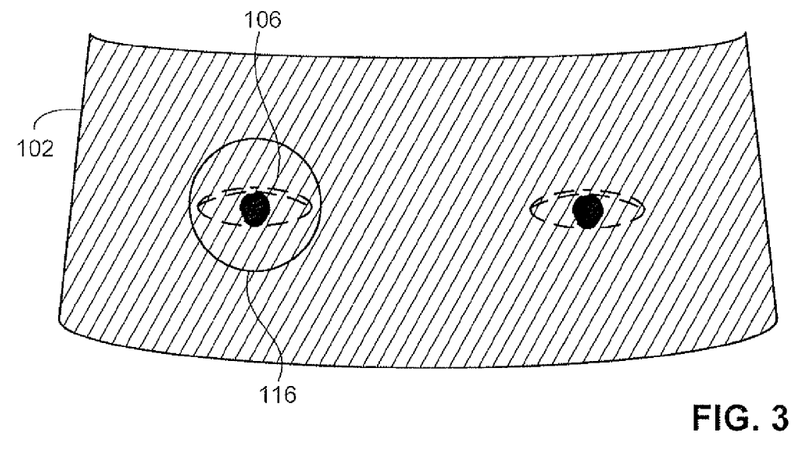
FIG. 3 is a schematic illustration front view of the visor of FIG. 1C.

Reference is now made to FIGS. 1A, 1B, 1C, 2 and 3. FIG. 1A is a schematic illustration side view of a HMD system, generally referenced 100, constructed and operative in accordance with an embodiment of the disclosed technique, in which the visor and the display goggle are in operative positions. FIG. 1B is a schematic illustration of the system of FIG. 1A, in which the display goggle is in an operative position and the visor is in a stowed position. FIG. 1C is a schematic illustration of the system of FIG. 1A, in which the visor is in an operative position and the display goggle is in a stowed position. FIG. 2 is a schematic illustration front view of the visor of FIG. 1A. FIG. 3 is a schematic illustration front view of the visor of FIG. 1C.

With reference to FIG. 1A, HMD system 100 includes a tinted visor 102, a display goggle 104 and an optical cover 112. Tinted visor 102 is coupled with a helmet 108. Display goggle 104 is coupled with helmet 108, through an arm 110, at a coupling interface 114. Tinted visor 102 further includes a patch 116, which has controllable light transmission. Display goggle 104 includes a first end 120 and a second end 122. Display goggle 104 further includes an image generator 132 and an optical combiner 134. Optical cover 112 has controllable light transmission, and is located in front of second end 122 of display goggle 104. Image generator 132 generates an image, indicated by an arrow 136, toward combiner 134. Combiner 134 directs the generated image toward first end 120.

It is noted that the transmission of patch 116 and of optical cover 112 may be adjusted, for example, electronically, optically, thermally, chemically and the like (i.e., adjustable patch transmission). For example, patch 116 or optical cover 112 may be formed of materials with electrically controlled transmission, chemically adjustable transmission, thermally adjustable transmission, and the like. Alternatively, the light transmission of patch 116 or optical cover 112 may be controlled mechanically, by physically changing the elements with other elements having varying light transmission. Further alternatively, the transmission of patch 116 or optical cover 112 may be adjusted passively, by employing photo-chromic materials, which darken when exposed to light of certain wavelength (such as ultraviolet light). Further alternatively, optical cover 112 may be a filter, which filters out certain wavelengths. The user can remove optical cover 112 and replace it with other types of optical filters, according to the present ambient light. It is also noted that the transmission of patch 116 and of cover 112 may be controlled automatically, according to the degree of ambient light brightness. The degree of ambient light brightness may be obtained, for example, by a light detector (not shown), which may be located in the vicinity of visor 102. In accordance with yet another alternative embodiment of the disclosed technique, patch transmission is controlled by light emitted from the display unit (e.g., light emitted from image generator 132). For instance, patch 116 is formed by photo-chromic materials, and thereby the light transmission of patch 116 can be controlled by the light emitted from image generator 132. By controlling patch transmission by the light emitted from the image generator, the disclosed technique enables aligning the position of patch 116, and adjusting the size of patch 116, to the projected image.

In this manner, the light transmission of patch 116, or of different portions of patch 116, can be adjusted such that the more transparent area (i.e., the area of patch 116 that exhibits the largest light transmission) is optically aligned with the display unit. That is, the light transmission of the area of patch 116 which is optically aligned with the image provided by image generator 132 is adjusted to be of higher light transmission (i.e., more transparent) than the rest of patch 116 and of visor 102. Additionally, the size of the transparent area of patch 116 is adjusted to correspond to the size of the projected image provided by image generator 132. Thereby, the size of patch 116 is fitted to the dimensions of the projected image.

Tinted visor 102 is moveable in a direction indicated by an arrow 118, between an operative position 102A and a stowed position 102B (FIG. 1B). Patch 116 is located substantially in front of a user's eye 106, when the visor is in operative position 102A. Display goggle 104 is moveable between an operative position 104A and a stowed position 104C (FIG. 1C). In operative position 104A, display goggle 104 is located in front of eye 106, such that the optical axis (not shown) of the optical module substantially coincides with an optical axis 126 of eye 106. In this manner, the image generated by the image generator (e.g., symbology), indicated by an arrow 136, reflects off of combiner 134 and passes along optical axis 126 toward eye 106. Furthermore, light rays of a scene image, indicated by an arrow 124, pass along optical axis 126, through optical cover 112 and through combiner 134 toward eye 106. When visor 102 is in operative position 102A, and display goggle 104 directs display images toward eye 106, the light transmission of optical cover 112 is set to be similar to the light transmission of tinted visor 102.

In this manner, light rays reaching eye 106 through display goggle 104 and patch 116 (i.e., generated image 136 and scene image 124), are of similar brightness as the brightness of light rays (not shown) which reach eye 106 through other parts of visor 102. Thus, image generator 132 may be a standard power image generator, and does not have to be a high-power image generator, even when the ambient light conditions are very bright. The user thus is likely not to notice a difference in brightness between the generated images and the outside scene image.

With reference to FIG. 2, tinted visor 102 is shown from a front view indicated by dashed double-arrow line 138 in FIG. 1A. This view shows that patch 116 is located in front of eye 106. In the embodiment depicted in FIGS. 1A and 2, tinted visor 102 is shaded, while patch 116 is clear, allowing more light to pass there through toward eye 106, as described herein above.

In FIG. 1B, tinted visor 102 is located in stowed position 102B, in which it is stowed away from the user's face (not shown) and eye 106. Alternatively, a clear (i.e., un-tinted) visor (not shown) may be placed in front of the user's face, for example, a clear protective visor. Ambient light (not shown) may reach eye 106 directly (or through the clear visor), and not through tinted visor 102. The user may move visor 102 to stowed position 102B in various situations, for example, when the ambient light conditions are not bright, and there is no need for a tinted visor.

Display goggle 104 is in operative position 104A, located in front of eye 106. Image 136 (e.g., symbology) reflects off of combiner 134 and passes along optical axis 126 toward eye 106. Furthermore, light rays of a scene image, indicated by an arrow 124, pass along optical axis 126, through optical cover 112 and through combiner 134 toward eye 106. When visor 102 is in stowed position 102B, and display goggle 104 directs display images toward eye 106, optical cover 112 is set to be clear, allowing passage of light there through, without attenuating passing light.

In this manner, light rays reaching eye 106 through display goggle 104 (i.e., generated image 136 and scene image 124), are of similar brightness as light rays (not shown) which reach eye 106 directly (or through the clear visor). The user thus is not likely to notice a difference in brightness or in contrast between the generated images and the outside scene image.

In FIG. 1C, tinted visor 102 is located in operative position 102A, in which it is located in front of the user's face, and patch 116 is located substantially in front of eye 106. Display goggle 104 is located at a stowed position 104C, such that it is moved away from the user's face. As depicted in FIG. 1C, display goggle 104 is located above the user's face, and substantially outside of the field of view of the user. The user may move display goggle 104 to stowed position 104C in various situations when display is not desired or not required.

Light rays of a scene image, indicated by an arrow 124, pass along optical axis 126, through patch 116, toward eye 106. When visor 102 is in operative position 102A, and display goggle 104 is in stowed position 104C, the light transmission of patch 116 is set to be similar to the light transmission of the rest of tinted visor 102. It is noted that when display goggle 104 is in stowed position 104C, the user may place various optical filters (not shown) of desired transmission characteristics, in front of patch 116, in order to achieve similar light transmission as the rest of tinted visor 102.

In this manner, light rays reaching eye 106 through patch 116 are of similar brightness as light rays which reach eye 106 through sections of visor 102, other than patch 116. Thus, the tint of visor 102 is uniform, also in patch 116, such that the user thus does not notice a difference in brightness between different sections of the visor.

It is noted that patch 116 may have other optical characteristics, which differ from the rest of visor 102 (for example, chromaticity and the like). When each eye of the user views the outside scene through surfaces of different optical characteristics, it may cause certain discomfort to the viewing user. Thus, according to an alternative embodiment, the visor may optionally include an additional patch (not shown), which is located in front of the other eye (not shown) of the user. Such additional patch may have adjustable optical characteristics.

As elaborated above, when the display goggle is in the stowed position, the light transmission of the first patch (as patch 116) is set to be similar to the light transmission of the rest of the tinted visor. At the same time, the optical characteristics of the additional patch may be adjusted to be similar to the optical characteristics of the first patch. In this manner, both eyes of the user view the outside scene through surfaces with similar optical characteristics, thus avoiding the discomfort of each eye viewing through different optical characteristics.

With reference to FIG. 3, tinted visor 102 is shown from a front view indicated by dashed double-arrow line 144 in FIG. 1C. This view clearly shows that patch 116 is located in front of eye 106. In the embodiment depicted in FIGS. 1C and 3, both tinted visor 102 and patch 116 are similarly shaded, as described herein above.

It is noted that, display system 100 may further include an emergency mechanism (not shown), coupled with coupling interface 114. In an emergency occurrence, in which display goggle 104 may present a hazard to the user, the emergency mechanism would move display goggle 104 to stowed position 104C. Alternatively, the emergency mechanism may disconnect coupling interface 114 completely, thereby removing display goggle from helmet 108, and alleviating the hazard from the user. Such an emergency mechanism may include, for example, an accelerometer, for measuring the acceleration of the user's head during flight. In times of sudden acceleration, such as during a crash or sudden drop of an aircraft, the accelerometer may indicate that a state of emergency has occurred, and detach interface 114, in order to remove display goggle 104 and prevent injury to the user.

Figure 4:
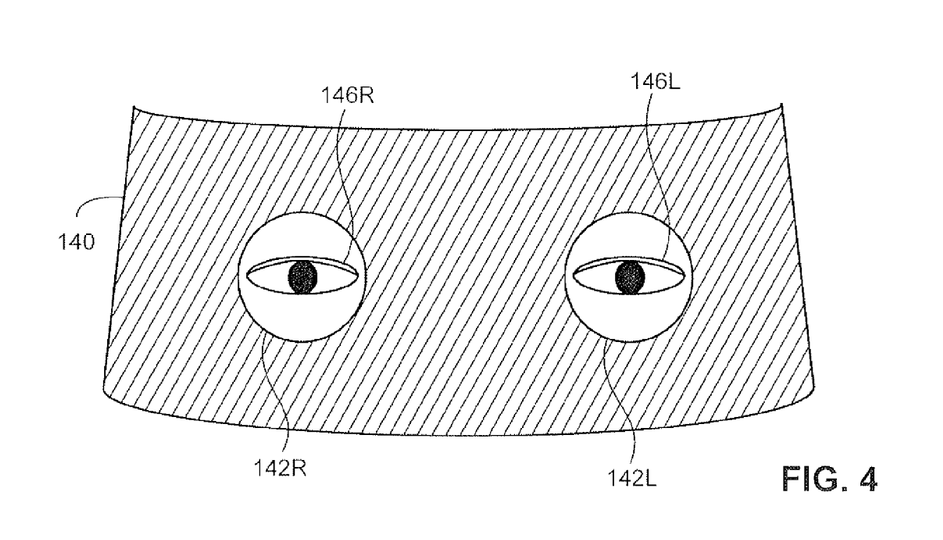
FIG. 4 is a schematic illustration front view of a tinted visor for a HMD system, constructed and operative in accordance with another embodiment of the disclosed technique.

According to another embodiment of the disclosed technique, the HMD includes two display goggles, one for each eye of the user, and thus the tinted visor of the HMD includes two patches, each located between a respective display goggle and a respective eye. Reference is now made to FIG. 4, which is a schematic illustration front view of a HMD tinted visor, generally referenced 140, constructed and operative in accordance with the other embodiment of the disclosed technique. Tinted visor 140 is shaded, and is similar to tinted visor 102 of FIG. 1A. Tinted visor 140 includes two patches, a right patch 142R and a left patch 142L, both of which may have controllable transmission. The degree of transmission may be adjusted manually or automatically, electronically or mechanically, similarly to patch 116 described above. Right patch 142R is located in front of right eye 146R, while left patch 142L is located in front of left eye 146L. The user can then observe a display through each eye, through the respective display goggle (not shown) and respective patch or patches 142R and 142L.

Figure 5:
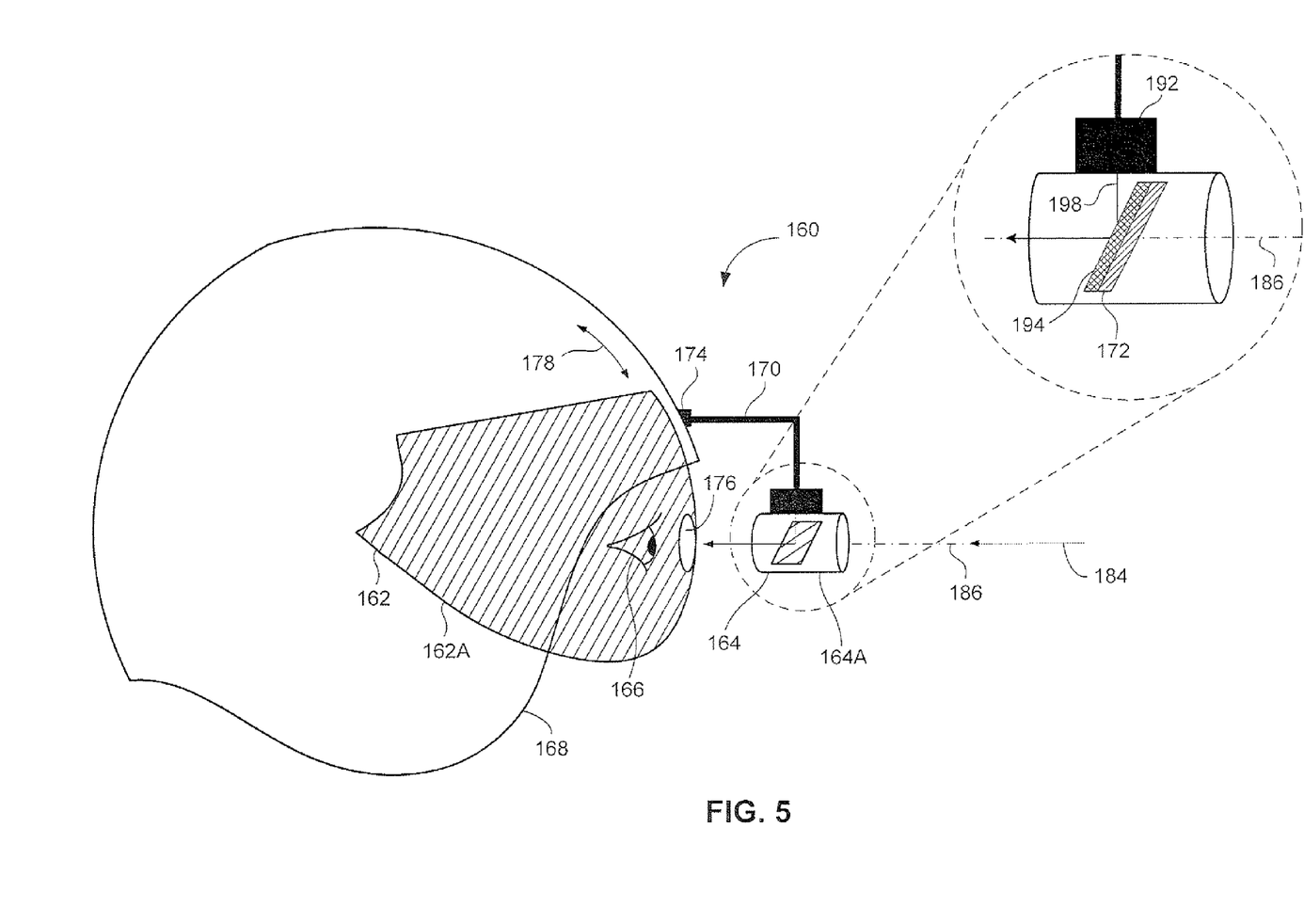
FIG. 5 is a schematic illustration side view of a HMD system, constructed and operative in accordance with a further embodiment of the disclosed technique.

Reference is now made to FIG. 5, which is a schematic illustration side view of a HMD system, generally referenced 160, constructed and operative in accordance with another embodiment of the disclosed technique. HMD system 160 includes a tinted visor 162, and a display goggle 164. Tinted visor 162 is coupled with a helmet 168. Display goggle 164 is coupled with helmet 168, through an arm 170, at a coupling interface 174. Tinted visor 162 further includes a patch 176, which has controllable light transmission. Display goggle 164 further includes an image generator 192, an optical combiner 194, and combiner tint cover 172. Combiner tint cover 172 has controllable light transmission, and is located adjacent to combiner 194, facing an outside scene, indicated by arrow 184. It is noted that combiner tint cover 172 may be a tinted layer of combiner 196, instead of a separate element. For the sake of simplicity, the present description will relate to combiner tint cover 172 as a separate element. Image generator 192 generates an image, indicated by an arrow 198, toward the face of combiner 194, which is facing eye 166. Combiner 194 directs the generated image along optical axis 186 toward eye 166.

It is noted that the transmission of patch 176 and of combiner tint cover 172 may be adjusted, for example, electronically, optically, thermally, chemically and the like. For example, patch 176 or optical cover 172 may be formed of materials with electrically controlled transmission, chemically adjustable transmission, thermally adjustable transmission, and the like. Alternatively, the light transmission of patch 176 or optical cover 172 may be controlled mechanically, by physically changing the elements with other elements having varying light transmission. Further alternatively, the transmission of patch 176 or optical cover 172 may be adjusted passively, by employing photochromic materials, which darken when exposed to light of certain wavelength (such as ultraviolet light). Further alternatively, optical cover 172 may be a filter, which filters out certain wavelengths. The user can remove optical cover 172 and replace it with other types of optical filters, according to the present ambient light. It is also noted that the transmission of patch 176 and of cover 172 may be controlled automatically, according to the degree of ambient light brightness. The degree of ambient light brightness may be obtained, for example, by a light detector (not shown), which may be located in the vicinity of visor 162.

In accordance with yet another alternative embodiment of the disclosed technique, patch transmission is controlled by light emitted from the display unit (e.g., light emitted from image generator 192). For instance, patch 176 is formed by photo-chromic materials, and thereby the light transmission of patch 176 can be controlled by the light emitted from image generator 192. By controlling patch transmission by the light emitted from the image generator, the disclosed technique enables aligning the position of patch 176, and adjusting the size of patch 176, to the projected image.

In this manner, the light transmission of patch 176, or of different portions of patch 176, can be adjusted such that the more transparent area is optically aligned with the display unit. That is, the light transmission of the area of patch 176 which is optically aligned with the image provided by image generator 192 is adjusted to be more transparent than the rest of patch 176 and of visor 162. Additionally, the size of the transparent area of patch 176 is adjusted to correspond to the size of the projected image provided by image generator 192. Thereby, the size of patch 176 is fitted to the dimensions of the projected image.

Further in this manner, in case that in a selected moment in time, the image generator does not produce an image, the patch transmission can be adjusted to be similar to the rest of the tinted visor. When the image generator projects an image toward the user, the projected image adjusts the light transmission of the patch, such that the light intensity of the projected image is similar to that of the ambient light arriving through the tinted area of the visor.

Tinted visor 162 is moveable in a direction indicated by an arrow 178, between an operative position 102A and a stowed position (not shown). Patch 176 is located substantially in front of a user's eye 166, when the visor is in operative position 162A. Display goggle 164 is moveable between an operative position 104A and a stowed position (not shown). In operative position 164A, display goggle 164 is located in front of eye 166, such that the optical axis (not shown) of combiner 194 substantially coincides with an optical axis 186 of eye 166. In this manner, the image generated by image generator 192 (e.g., symbology), indicated by an arrow 196, reflects off of combiner 194 and passes along optical axis 186 toward eye 166. Furthermore, light rays of an outside scene image, indicated by an arrow 184, pass along optical axis 186, through combiner tint cover 172 and through combiner 194 toward eye 166. When visor 162 is in operative position 162A, and display goggle 164 directs display images toward eye 166, the light transmission of combiner tint cover 172 is set to be similar to the light transmission of tinted visor 162.

In this manner, light rays reaching eye 166 through display goggle 164 and patch 176 (i.e., generated image 198 and outside scene image 184), are of similar brightness as the brightness of outside light rays (not shown) which reach eye 166 through other parts of visor 162. Thus, image generator 192 may be a standard power image generator, and does not have to be a high-power image generator, even when the ambient light conditions are very bright. The user thus is likely not to notice a difference in brightness between the generated images and the outside scene image.

Figure 6:
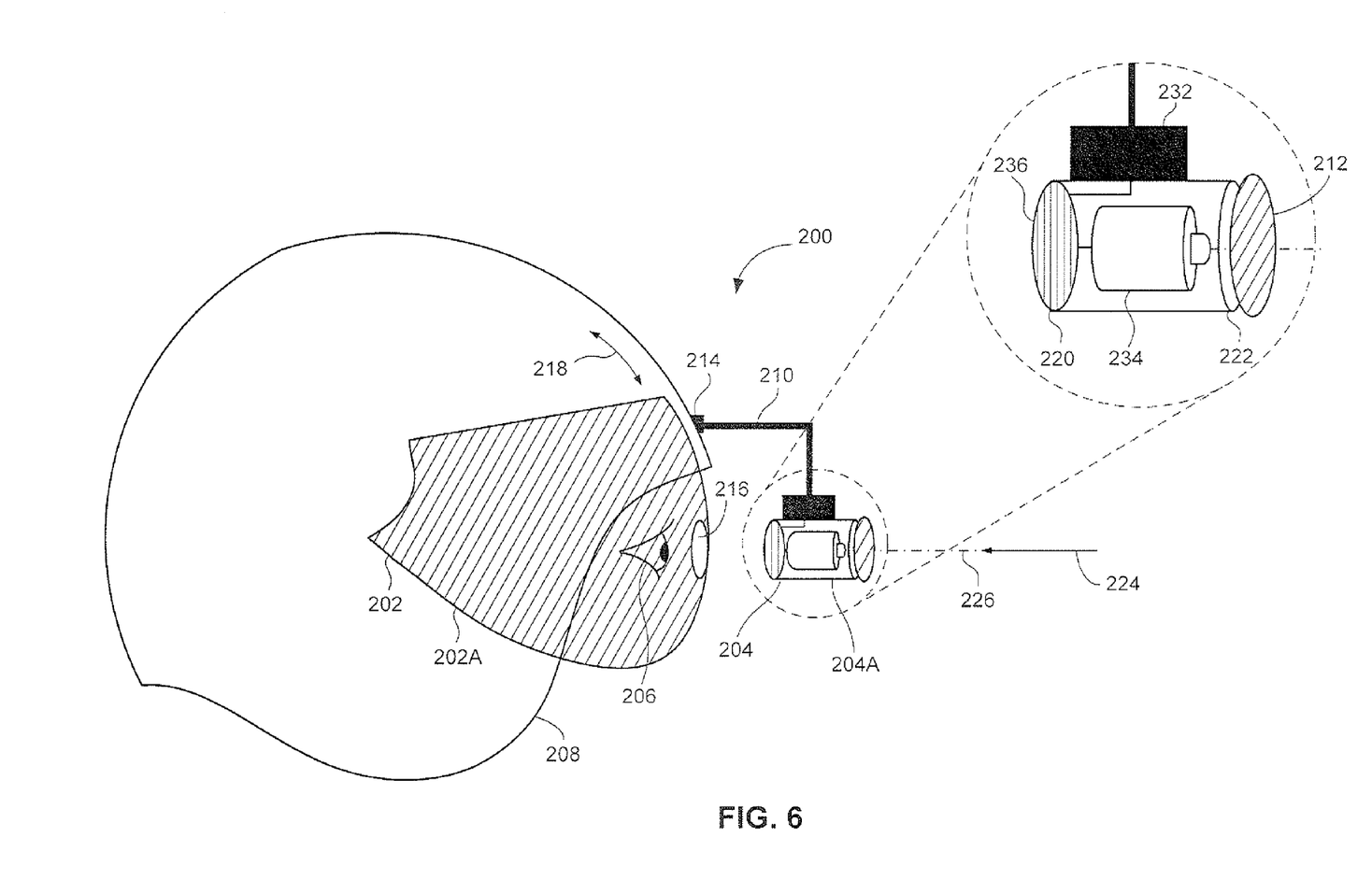
FIG. 6 is a schematic illustration side view of a HMD system, constructed and operative in accordance with another embodiment of the disclosed technique.

Reference is now made to FIG. 6, which is a schematic illustration side view of a HMD system, generally referenced 200, constructed and operative in accordance with another embodiment of the disclosed technique. HMD system 200 includes a tinted visor 202, a display goggle 204 and an optical cover 212. Tinted visor 202 is coupled with a helmet 208. Display goggle 204 is coupled with helmet 208, through an arm 210, at a coupling interface 214. Tinted visor 202 further includes a patch 216, which has controllable light transmission. Display goggle 204 includes a first end 220 and a second end 222. Display goggle 204 further includes an image generator 232, an image acquiring device 234 (e.g., a camera 234), and a display screen 236.

Display screen 236 is located proximate to first end 220 of display goggle 204, such that display screen is located in front of patch 216. Optical cover 212 has controllable light transmission, and is located in front of second end 222 of display goggle 204. Display screen 236 is coupled with image generator 232 and with camera 234. Camera 234 acquires an image of an outside scene, indicated by arrow 224, passing through optical cover 212. In this manner, light rays of outside scene 224 are attenuated by cover 212, before reaching camera 234. Camera 234 then transmits the acquired outside scene image for display on display screen 236. Image generator 232 generates an image (not shown), which may include any user-required data, such as symbology, flight data and the like. The generated image is superimposed with the outside scene image, on display screen 236.

It is noted that the light transmission of patch 216 and of optical cover 212 may be adjusted, for example, electronically, optically, thermally, chemically and the like. For example, patch 216 or optical cover 212 may be formed of materials with electrically controlled light transmission, chemically adjustable light transmission, thermally adjustable light transmission, and the like. Alternatively, the light transmission of patch 216 or optical cover 212 may be controlled mechanically, by physically changing these elements with other elements having varying light transmission. Further alternatively, the light transmission of patch 216 or optical cover 212 may be adjusted passively, by employing photochromic materials, which darken when exposed to light of certain wavelength (such as ultraviolet light). Further alternatively, optical cover 212 may be a filter, which filters out certain wavelengths. The user can remove optical cover 212 and replace it with other types of optical filters, according to the present ambient light. It is also noted that the transmission of patch 216 and of cover 212 may be controlled automatically, according to the degree of ambient light brightness. The degree of ambient light brightness may be obtained, for example, by a light detector (not shown), which may be located in the vicinity of visor 202.

In accordance with yet another alternative embodiment of the disclosed technique, patch transmission is controlled by light emitted from the display unit. For instance, the patch is formed by photo-chromic materials, and thereby the light transmission of the patch can be controlled by the light emitted from the image generator. By controlling patch transmission by the light emitted from the image generator, the disclosed technique enables aligning the position of the patch, and adjusting the size of the patch, to the projected image.

Tinted visor 202 is moveable in a direction indicated by an arrow 218, between an operative position 202A and a stowed position (not shown). Patch 216 is located substantially in front of a user's eye 206, when the visor is in operative position 202A. Display goggle 204 is moveable between an operative position 204A and a stowed position (not shown), similarly to display goggle 104 of FIGS. 1A, 1B and 1C. In operative position 204A, display goggle 204 is located in front of eye 206, such that the optical axis (not shown) thereof substantially coincides with an optical axis 226 of eye 206. In this manner, the images displayed on screen 236 are transmitted along optical axis 226 toward eye 206.

When visor 202 is in operative position 202A, and display goggle 204 directs display images toward eye 206, the light transmission of optical cover 212 is set to be similar to the light transmission of tinted visor 202. In this manner, the outside-scene image acquired by camera 234 is of similar brightness as the brightness of light rays (not shown) which reach eye 206 through other parts of visor 202. Thus, image generator 232 may be a standard power image generator, and does not have to be a high-power image generator, even when the ambient light conditions are very bright. The user thus is likely not to notice a difference in brightness or contrast between the generated image and the outside scene image, both of which are superimposed on screen 236.

It will be appreciated by persons skilled in the art that the disclosed technique is not limited to what has been particularly shown and described hereinabove. Rather the scope of the disclosed technique is defined only by the claims, which follow.

The invention claimed is:

1. A Helmet Mounted Display (HMD) system, to be mounted on a helmet of a user, said HMD comprising:
   a tinted visor, coupled with said helmet, said tinted visor being located in front of the face of said user when said tinted visor is in an operative position, and outside of the field of view of said user when said tinted visor is in a stowed position, said tinted visor further including a patch, said patch being located in front of an eye of said user, said patch having greater light transmission than the rest of said tinted visor;
   an image generator, coupled with said helmet, generating an image to be displayed to said user;

an optical combiner, coupled with said helmet and separated from said tinted visor, said optical combiner being located externally to said tinted visor, said optical combiner intersects the optical axis of said eye, said optical combiner reflecting said generated image toward said eye, said optical combiner transferring light rays of an outside scene toward said eye; and a tint cover, located between said optical combiner and said outside scene, such that light rays from said outside scene pass through said tint cover, said optical combiner, and through said patch before reaching said eye.

2. The HMD system of claim 1, wherein said optical cover is located adjacent to a surface of said optical combiner, between said optical combiner and said outside scene.

3. The HMD of claim 1, further comprising a display goggle, said optical combiner being enclosed within said display goggle, said display goggle being coupled with said helmet, said display goggle being located in front of said patch, said display goggle intersects the optical axis of said eye, when said display goggle is in an operative position, said display goggle and said optical combiner being located outside of the field of view of said user, when said display goggle is in a stowed position.

4. The HMD system of claim 3, further comprising an emergency mechanism, coupled with said display goggle, wherein in an emergency occurrence said emergency mechanism moves said display goggle to said stowed position.

5. The HMD system of claim 4, wherein said emergency mechanism removes said display goggle from said helmet.

6. The HMD system of claim 5, wherein said emergency mechanism includes an accelerometer for measuring the acceleration of the head of said user, wherein when said accelerometer indicates sudden acceleration, said emergency mechanism removes said display goggle from said helmet.

7. The HMD system of claim 4, wherein said emergency mechanism is further coupled with said image generator.

8. The HMD of claim 1, wherein said patch has controllable light transmission.

9. The HMD of claim 8, wherein the light transmission of said patch is selected from the list consisting of:
   automatically controlled light transmission; and
   manually controlled light transmission.

10. The HMD system of claim 8, wherein said light transmission is controlled in a manner selected from the list consisting of:
    electronically,
    chemically,
    thermally,
    mechanically, and
    photochromically.

11. The HMD system of claim 8, wherein said optical combiner is moveable between said operative position and a stowed position,
    wherein in said stowed position said optical combiner is located outside of the field of view of said user,
    wherein when said optical combiner is located in said stowed position, and said tinted visor is located in said operative position, said patch is set to have the same light transmission as the rest of said tinted visor.

12. The HMD system of claim 8, further comprising a light sensor, said light sensor detecting the brightness level of the ambient light in the vicinity of said helmet, wherein said light transmission is adjusted according to said detected ambient light level.

13. The HMD system of claim 1, wherein said optical cover is tinted to allow light transmission similar to the light transmission of said tinted visor.

14. The HMD system of claim 1, wherein said optical cover has controllable light transmission.

15. The HMD system of claim 14, wherein the light transmission of said optical cover is selected from the list consisting of:
    automatically controlled light transmission; and
    manually controlled light transmission.

16. The HMD system of claim 14, wherein said tinted visor is moveable between said operative position and a stowed position,
    wherein in said stowed position said tinted visor is located outside of the field of view of said user,
    wherein when said optical combiner is located in said operative position, and said tinted visor is located in said stowed position, said cover is set to be clear.

17. The HMD system of claim 14, wherein said light transmission is controlled in a manner selected from the list consisting of:
    electronically,
    chemically,
    thermally,
    mechanically, and
    photochromically.

18. The HMD system of claim 14, further comprising a light sensor, said light sensor detecting the brightness level of the ambient light in the vicinity of said helmet, wherein said light transmission is adjusted according to said detected ambient light level.

19. The HMD system of claim 1, wherein said tinted visor further includes a second patch having greater light transmission than the rest of said tinted visor, said second patch being located in front of the second eye of said user, said HMD further comprising:
    a second image generator, coupled with said helmet, generating an image to be displayed to said user;
    a second optical combiner, coupled with said helmet, said second optical combiner intersects the optical axis of said second eye, said second optical combiner reflecting said generated image from said second image generator toward said second eye, said second optical combiner transferring light rays of an outside scene toward said second eye.

20. The HMD system of claim 19, further comprising a second optical cover, located between said second optical combiner and said outside scene, such that light rays from said outside scene pass through said second optical cover, said second optical combiner, and through said second patch before reaching said second eye, said second optical cover being tinted.

21. A Helmet Mounted Display (HMD) system, to be mounted on a helmet of a user, said HMD comprising:
    a tinted visor, coupled with said helmet, said tinted visor being located in front of the face of said user when said tinted visor is in an operative position, and outside of the field of view of said user when said tinted visor is in a stowed position, said tinted visor further including a patch, said patch being located in front of an eye of said user, said patch having greater light transmission than the rest of said tinted visor;
    a display screen separated from said tinted visor, said display screen being located in front of said patch and intersecting the optical axis of said eye;
    an image acquisition device, coupled with said display screen, said image acquisition device acquiring an outside-scene image, and transmitting said outside-scene image for display on said display screen;

an image generator, coupled with said helmet and with said display screen, said image generator generating an image to be displayed to said user, said image generator transmitting said generated image to be superimposed with said outside-scene image on said display screen, said superimposed image being transmitted through said patch toward said eye; and a tint cover, located between said image acquisition device and said outside scene, such that light rays from said outside scene pass through said tint cover, before reaching said image acquisition device, said optical cover being tinted.

* * * * *